US008181165B2

(12) United States Patent
Cipresso et al.

(10) Patent No.: US 8,181,165 B2
(45) Date of Patent: May 15, 2012

(54) USING ANNOTATIONS TO REUSE VARIABLE DECLARATIONS TO GENERATE DIFFERENT SERVICE FUNCTIONS

(75) Inventors: Teodoro Cipresso, San Jose, CA (US); Laurence Edward England, Morgan Hill, CA (US); Gary Isaak Mazo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 11/929,692

(22) Filed: Oct. 30, 2007

(65) Prior Publication Data

US 2009/0113401 A1 Apr. 30, 2009

(51) Int. Cl.
*G06F 9/45* (2006.01)
(52) U.S. Cl. ......... 717/137; 717/117; 717/120; 717/151
(58) Field of Classification Search ........................ None
See application file for complete search history.

(56) References Cited

U.S. PATENT DOCUMENTS

| | | | |
|---|---|---|---|
| 5,805,888 A * | 9/1998 | Sasaki et al. ................. | 717/141 |
| 6,353,925 B1 * | 3/2002 | Stata et al. ................... | 717/112 |
| 7,707,544 B2 * | 4/2010 | Beust ........................... | 717/106 |
| 7,966,602 B1 * | 6/2011 | Webster et al. .............. | 717/114 |
| 2003/0005181 A1 * | 1/2003 | Bau et al. ..................... | 709/330 |
| 2003/0023957 A1 * | 1/2003 | Bau et al. ..................... | 717/140 |
| 2004/0133418 A1 | 7/2004 | Turcato et al. | |
| 2004/0225995 A1 * | 11/2004 | Marvin et al. ................ | 717/100 |
| 2005/0021689 A1 | 1/2005 | Marvin et al. | |
| 2005/0256825 A1 | 11/2005 | Dettinger et al. | |
| 2006/0048093 A1 | 3/2006 | Jain et al. | |
| 2006/0129591 A1 | 6/2006 | Ramsey et al. | |
| 2006/0149817 A1 | 7/2006 | Bou-Ghannam et al. | |
| 2006/0271917 A1 * | 11/2006 | Das et al. ..................... | 717/130 |
| 2006/0294502 A1 | 12/2006 | Das et al. | |
| 2007/0083503 A1 * | 4/2007 | Saha et al. .................... | 707/5 |
| 2008/0114937 A1 * | 5/2008 | Reid et al. .................... | 711/117 |
| 2008/0127146 A1 * | 5/2008 | Liao et al. .................... | 717/150 |
| 2008/0235661 A1 * | 9/2008 | Arpana et al. ................ | 717/116 |
| 2009/0055800 A1 * | 2/2009 | Peshansky et al. ........... | 717/114 |

OTHER PUBLICATIONS

Farrell, J, and H. Lausen (Eds.), "Semantic Annotations for WSDL", W3 Working Draft, [online], Jun. 30, 2006, [retrieved on Oct. 7, 2007], retrieved from the Internet at <URL: http://www.w3.org/tr/2006/WD-sawsdl-20060630/>, 10 pp.

(Continued)

*Primary Examiner* — Isaac Tecklu
(74) *Attorney, Agent, or Firm* — David W. Victor; Konrad Raynes & Victor LLP

(57) ABSTRACT

Provided are a method, system, and article of manufacture for using annotations to reuse variable declarations to generate different service functions. A declaration file has variable declarations in a first programming language environment for use by application functions. The declaration file includes a plurality of sets of annotations for a plurality of service functions. Each of the sets of annotations identifies variables in the declaration file to use with one of the service functions. The declaration file is processed to generate one of the service functions. The set of annotations in the declaration file for the service function to generate is determined. The determined set of annotations is processed to determine variables to include with the service function to generate. The determined variables from the declaration file are used to generate the service function.

25 Claims, 3 Drawing Sheets

OTHER PUBLICATIONS

IBM Corporation, "Enterprise Service Tools", WebSphere Developer for System z, Version 7.0, [online], 2006, [retrieved on Oct. 7, 2007], retrieved from the Internet at <URL: http://publib.boulder.ibm.com/infocenter/wdzinfo/v7r0/topic/com.ibm.etools.est.doc/topics...>, 1 pg.

Jensen, L.R., "A Reuse Repository with Automated Synonym Support and Cluster Generation", 2004, 129 pp.

Sun Microsystems, "Annotations", [online], 2004, [retrieved on Oct. 7, 2007], retrieved from the Internet at <URL: http://java.sun.com/j2se/1.5.0/docs/guide/language/annotations.html>, 4 pp.

Sun Microsystems, "How to Write Doc Comments for the Javadoc Tool", [online], 2004, [retrieved on Oct. 25, 2007], retrieved from the Internet at <URL: http://java.sun.com/j2se/javadoc/writingdoccomments/index.html>, 18 pp.

Wikipedia, "Copybook", [online], last modified on Aug. 28, 2007, [retrieved on Oct. 22, 2007], retrieved from the Internet at <URL: http://en.wikipedia.org/w/index.php?title=copybook&printable=yes>, 1 pp.

IBM Corporation, "Developing XML Interfaces for COBOL Applications", IBM WebSphere Developer for zSeries Version 6.0.1, Second Edition, Oct. 2005, 168 pp.

* cited by examiner

USING ANNOTATIONS TO REUSE VARIABLE DECLARATIONS TO GENERATE DIFFERENT SERVICE FUNCTIONS

BACKGROUND OF THE INVENTION

1. Field of the Invention

The present invention relates to a method, system, and article of manufacture for using annotations to reuse variable declarations to generate different service functions.

2. Description of the Related Art

Legacy applications, such as a third generation programming languages (e.g., Common Business-Oriented Language (COBOL), etc.) may utilize COPYBOOK or other "include" mechanisms to re-use data declarations for multiple programs or functions. Typically, such application architectures were used in closed environments in such a way as to eliminate the necessity for controlling what parts of the data declaration would be relevant or visible to the callers of those various functions. Typically, only relevant parts of the interface would be set by the callers' program logic and irrelevant data parts would be ignored.

Program developers have been implementing services and functions in the legacy application that use the COPYBOOK in a different programming environment, such as a service in a Services Oriented Architectures (SOA) environment. Programmers implementing service functions that utilize the COPYBOOK or include mechanism may use a tool that allows them to select which variables in the COPYBOOK to include with the service function being generated for the different programming environment. A graphical user interface (GUI) may display the variables in the COPYBOOK and allow the user to select which variables to include or exclude from a particular service function being generated. This information on the selected variables from the COPYBOOK may be maintained outside the COPYBOOK for use by the tool generating the service function.

Certain programmers include annotations in the COPYBOOK which may be used by multiple programs. Annotations are metadata included in a program source that is written in a "host" programming language such as a JAVA™ or COBOL programming language. (Java is a trademark of Sun Microsystems, Inc. in the United States and foreign countries)

There is a need in the art for improved techniques for reusing declaration files, such as the COBOL COPYBOOK file, when generating service functions to operate in a programming environment different from the programming environment in which the declaration file, e.g., COPYBOOK, was generated, which may comprise a legacy application such as COBOL.

SUMMARY

Provided are a method, system, and article of manufacture for using annotations to reuse variable declarations to generate different service functions. A declaration file has variable declarations in a first programming language environment for use by application functions. The declaration file includes a plurality of sets of annotations for a plurality of service functions. Each of the sets of annotations identifies variables in the declaration file to use with one of the service functions. The declaration file is processed to generate one of the service functions. The set of annotations in the declaration file for the service function to generate is determined. The determined set of annotations is processed to determine variables to include with the service function to generate. The determined variables from the declaration file are used to generate the service function.

In a further embodiment, a plurality of service function generators process the declaration file to determine the set of annotations corresponding to the service function being generated to use to determine the variables to include in the service function being generated.

In a further embodiment, the determined set of annotations is used to process the determined variables, wherein the processed determined variables are used to generate the service function.

In a further embodiment, processing the determined variables comprises renaming at least one of the determined variables from the declaration file, and wherein the at least one renamed determined variable is used to generate the service function.

In a further embodiment, the sets of annotations for different service functions indicate variables in the declaration file to exclude from the service functions and the determined variables to include comprise variables in the declaration file not excluded in the sets of annotations for the service functions.

In a further embodiment, a core action vocabulary includes semantic representations of actions to perform with respect to variables in the declaration file. The sets of annotations for the service functions include the semantic representations defined in the action vocabulary to perform defined actions with respect to the variables. The core action vocabulary is used to determine the actions to perform for the semantics included in the sets of annotations with respect to the variables in the declaration file.

In a further embodiment, at least one synonym action vocabulary includes the semantic representations of actions to perform with respect variables in the declaration file. The sets of annotations for the service functions include the semantic representations defined in the at least one synonym action vocabulary to perform defined actions with respect to the variables. The synonym action vocabulary provides semantic representations of actions that differ from the semantic representations defined in the core action vocabulary.

In a further embodiment, the set of annotations is processed for a selected one of the service functions. A determination is made as to whether there is a synonym action vocabulary for the processed set of annotations. The synonym action vocabulary for the processed set of annotations is used to determine the actions corresponding to the semantics in the processed set of annotations in response determining that there is a synonym action vocabulary for the processed set of actions. The core action vocabulary for the processed set of annotations is used to determine the actions corresponding to the semantics in the processed set of annotations in response determining that there is no synonym action vocabulary for the processed set of actions.

In a further embodiment, the declaration file is written to define variables for use by functions in a first programming environment and wherein the service functions are generated in a second programming environment.

DETAILED DESCRIPTION

Figure 1:
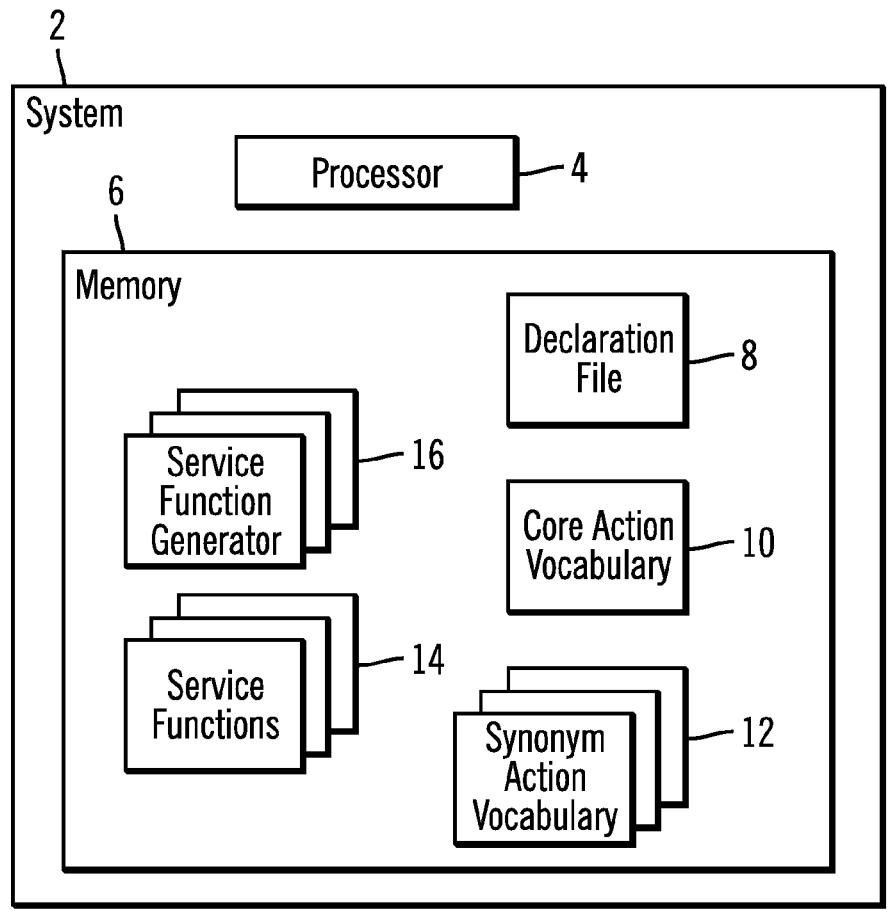
FIG. 1 illustrates an embodiment of a computing environment.

FIG. 1 illustrates an embodiment of a computing environment including a computer system 2 having a processor 4 and a memory 6 which includes program components executed by the processor 4. The memory 6 includes a declaration file 8 comprising data declarations of variables and parameters used by program functions in a programming environment, such as a legacy application environment. For instance, in the COBOL application programming environment, the programmer may create a COPYBOOK that provides data declarations that may be reused by multiple programs or functions. A core action vocabulary 10 provides a set of expressions or words for possible actions to perform with respect to variables and parameters defined in the declaration file 8. These expressions or words carry the semantic meaning for the said actions. For example, the word "Delete" specified in the core action vocabulary 10 carries the meaning (or semantic action) of omitting a certain parameter.

One or more synonym action vocabularies 12 provide a correspondence between the core action vocabulary and alternative lexical representations of the actions that include one or more differences with the semantic expressions or words included in the core action vocabulary 10. For example, a synonym for the "DELETE" action from the core vocabulary can correspond to the word "OMIT" in one synonym action vocabulary, to the word "ELIDE" in another, to the word "BORRAR" in the third, to the word "CANCELLARE" in the fourth, and so on. Each synonym action vocabulary 12 provides specific representation for semantic actions for one or more service functions 14 to generate.

A service function generator 16 comprises a program or tool that generates one or more service functions 14. The service functions 14 may operate in a programming environment that is different from the programming environment of the declaration file 8. For instance, the programming environment of the service functions 14 may comprise a Services Oriented Architecture (SOA), such as a web services environment, where the programming environment of the declaration file 8 may comprise a legacy application, such as a COBOL application.

In one embodiment, the components shown in FIG. 1, such as the program components 8, 10, 12, 14, and 16 may be implemented and processed in a single computer system. In a further embodiment, the components 8, 10, 12, 14, and 16 may execute in a distributed computing environment on different computer systems.

Figure 2:
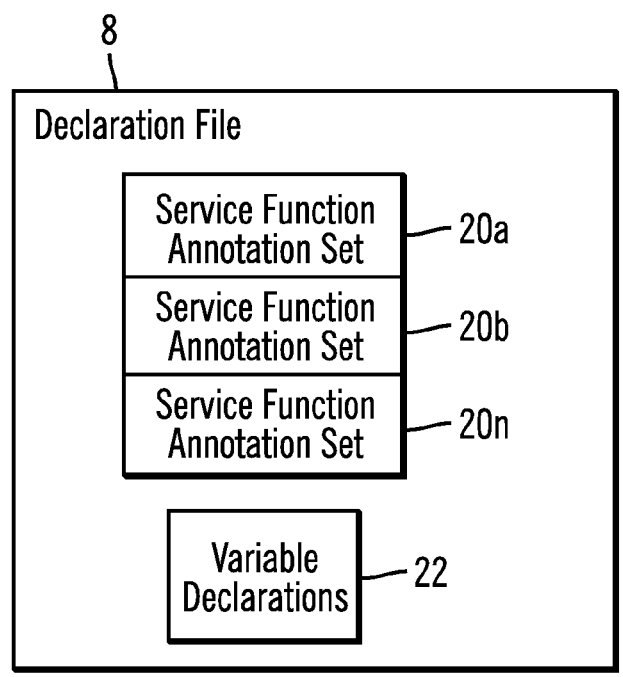
FIG. 2 illustrates an embodiment of a declaration file.

FIG. 2 illustrates an embodiment of the declaration file 8 as including variable declarations 22 in a programming environment, such as a legacy programming language environment, that differs from the programming environment in which the service invocation operates. The declaration file 8 further includes a set of annotations 20a, 20b . . . 20n, one for each service function 14 to generate. As discussed, the set of annotations 20a, 20b . . . 20n include semantics corresponding to actions to perform with respect to the variables 22. The actions may concern excluding certain variables from the service function 14 interface being generated by the service function generator 16 or actions to rename certain variables 22 to a naming convention compatible with the service function 14. Additional actions may further be provided. In one embodiment, each annotation in a set of annotations 20a, 20b . . . 20n includes an indicator of the service function to which the set of annotations applies. Alternatively, there may be alternative information indicating the associations of annotations 20a, 20b . . . 20n to service functions internal or external to the declaration file 8.

The action vocabularies 10 and 12 may include an array or list associating action semantics or names with specific actions to perform. The semantics or names in the action vocabularies 10 and 12 may differ, but the underlying actions are the same. The synonym action vocabularies 12 include an indication of the one or more service function names with which the vocabulary 12 is associated. If a service function 14 to generate does not have a synonym action vocabulary 12, then the core action vocabulary 10 is used to interpret the semantics or names in the set of annotations 20a, 20b . . . 20n.

Figure 3:
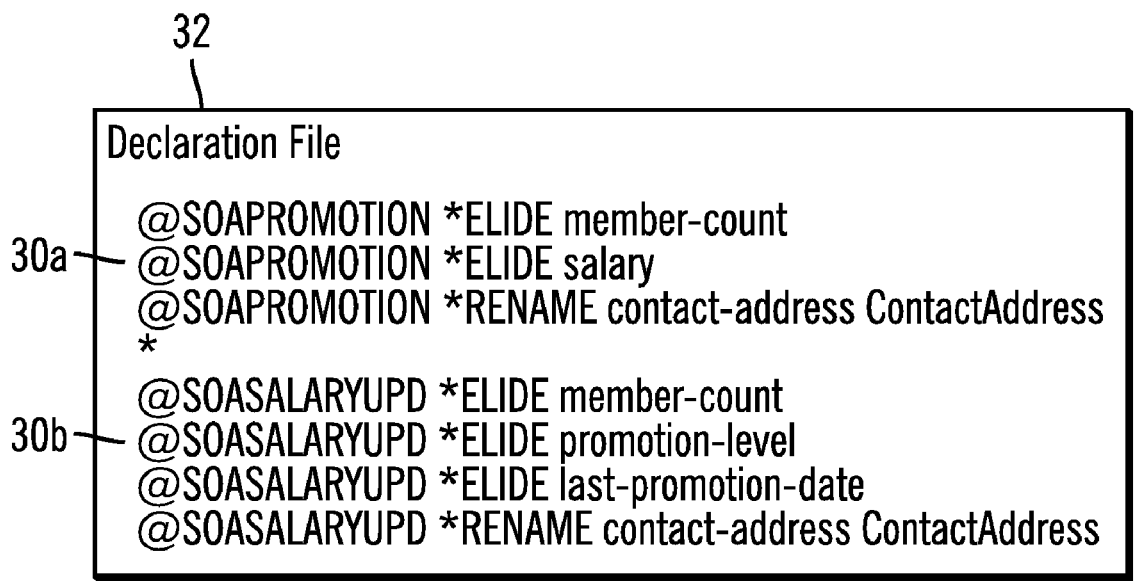
FIG. 3 illustrates an example of sets of annotations in the declaration file.

FIG. 3 provides an example of two annotation sets 30a and 30b included in a declaration file 32, such as declaration file 8. Annotation set 30a provides annotations for an "SOA promotion" service function that includes the semantic action of deletion expressed as "ELIDE" which indicates to exclude two variables from the "SOA promotion" service function and to generate and rename the "contact-address" variable in the variable declarations 22 to "ContactAddress" for use with the "SOA promotion" service function. Annotation set 30b provides annotations for an "SOA salary update" service function that includes the semantic action of deletion expressed as "ELIDE" which indicates to exclude three variables from the "SOA salary update" service function and to generate and rename the "contact-address" variable in the variable declarations 22 to "ContactAddress" for use with the "SOA salary update" service function.

A service function programmer would include a set of annotations 20a, 20b . . . 20n in the declaration file 8 for use by a service function generator 16. Further, the service function programmer may provide a synonym action vocabulary 12 for use by the service function generator 16.

In one embodiment, a file or other data structure, such as a service specification or description, identifies for a declaration file 8 the core action vocabulary 10 and any synonym action vocabularies 12, and location information on how to access the vocabularies 10 and 12 for the declaration file 8. The service function generators 16 would access this information to determine the vocabularies 10 and 12 to process when processing the sets of annotations 20a, 20b . . . 20n in the declaration file.

Figure 4:
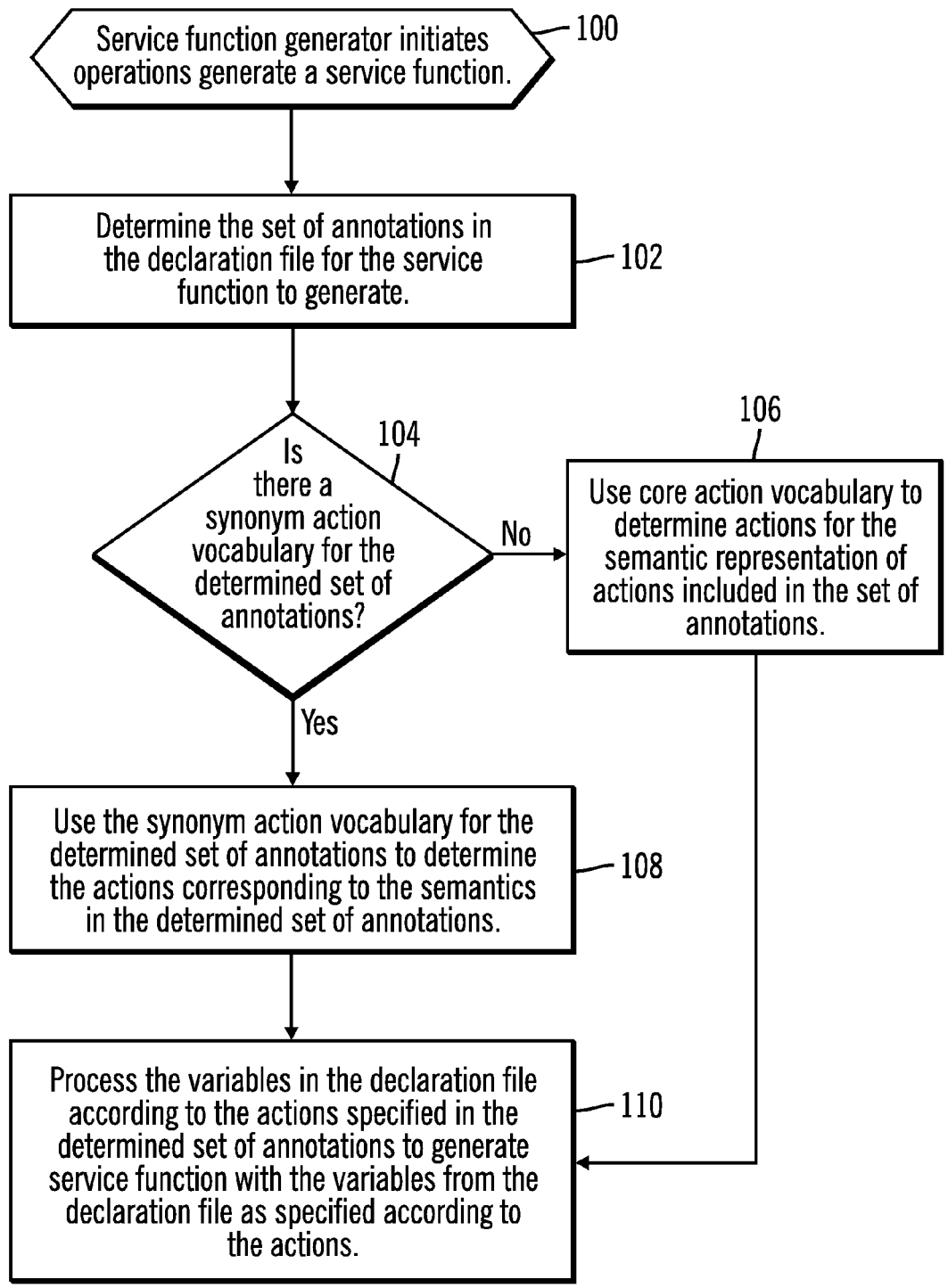
FIG. 4 illustrates an embodiment of operations to generate a service function using the sets of annotations in the declaration file.

FIG. 4 illustrates an embodiment of operations performed by one of the service function generators 16 to generate a service function 14 interface. Upon initiating (at block 100) the service function generation procedure, the service function generator 16 determines (at block 102) the set of annotations 20a, 20b . . . 20n in the declaration file 8 for the service function 14 to generate. As discussed with respect to FIG. 3, these annotations may be identified because each annotation includes an indicator or name of the service function being generated. If (at block 104) there is no synonym action vocabulary 12 for the determined set of annotations 20a, 20b . . . 20n, then the service function generator 16 uses (at block 106) the core action vocabulary 10 to determine actions for the semantic representation of actions included in the set of annotations. To determine whether there is a synonym action vocabulary 12 for the service function to generate, the service function generator 16 may process the synonym action vocabularies 12 to determine if one is specified as provided for the service function being generated. Alternatively, there may be a map or table indicating synonym action vocabularies 12 provided for service functions.

If (at block 104) there is a synonym action vocabulary 12 for the service function 14 being generated, then the service function generator 16 uses (at block 108) the synonym action vocabulary 12 for the determined set of annotations 20a, 20b . . . 20n to determine the actions corresponding to the semantics in the determined set of annotations 20a, 20b . . . 20n. The service function generator 16 processes (at block 110) the variables in the declaration file 8 according to the actions specified in the determined set of annotations 20a, 20b . . . 20n to generate the service function with the variables from the declaration file 8 as specified according to the actions. As discussed, the actions may specify to exclude certain declarations in the variable declarations 22 from being included in the service function 14 interface being generated or to rename variables to a name compatible with the naming convention of the service function 14 being generated.

Once the service function 14 is generated, using the variables from the declaration file 8, the service function 14 may be implemented and operate in a programming environment that is different from the programming environment for which the declaration file 8 was created, such as a legacy or other type of application environment.

The described embodiments provide the ability to identify those parameters/data declarations relevant for a given function invocation. Further, equally applicable to those languages having prototypes and to those not having prototypes, this provides for the ability to rename a parameter/data declaration to either conform to a different name space, to conform to shop standards, or to make the new name more usable.

With the described embodiments, annotations on how to use the variables in a declaration file 8 are directly indicated in the declaration file 8 in annotation sets 20a, 20b . . . 20n. Further, action vocabularies 10 and 12 may be associated with the declaration file 8 and used by the service function generators 16 when processing the declaration file 8 to generate a service function. Described embodiments provide techniques to include information in the declaration file 8 to indicate to the service function generators how to process and use the variables defined in the declaration file 8 when generating the service function 14 interface.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and a receiving station for transmitting and receiving transmission signals in which the code or logic is encoded, where the code or logic encoded in the transmission signal may be decoded and stored in hardware or a computer readable medium at the receiving and transmitting stations or devices. An "article of manufacture" comprises computer readable medium, hardware logic, and/or transmission transmitters or receivers in which code may be implemented. Those skilled in the art will recognize that many modifications may be made to this configuration without departing from the scope of the present invention, and that the article of manufacture may comprise suitable information bearing medium known in the art.

The described embodiments discuss semantics such as "Include", "Exclude" and "Rename". However, the semantics may also cover additional actions known in the art, such as "Join", "Separate", "Convert", "Encrypt", "MakeAttribute", "MakeElement" etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   providing a declaration file having variable declarations for variables in a programming environment for use by application functions, wherein the declaration file includes a plurality of sets of annotations for a plurality of service functions, wherein each of the sets of annotations identifies variables from the variables declared in the declaration file to use with one of the service functions, and wherein the declaration file is written to define variables for use by functions in the programming environment;
   processing the declaration file to generate one of the service functions;
   determining a set of annotations in the declaration file for the service function being generated;
   processing the determined set of annotations to determine variables from the variables to include with the service function being generated; and
   using the determined variables from the declaration file to generate the service function.

2. The method of claim 1, wherein a plurality of service function generators process the declaration file to determine the set of annotations corresponding to the service function being generated to use to determine the determined variables to include in the service function being generated.

3. The method of claim 1, further comprising:
   using the determined set of annotations to process the determined variables, wherein the processed determined variables are used to generate the service function.

4. The method of claim 3, wherein processing the determined variables comprises renaming at least one of the determined variables from the declaration file, and wherein the at least one renamed determined variable is used to generate the service function.

5. The method of claim 1, wherein the sets of annotations for different service functions indicate variables of the variables declared in the declaration file to exclude from the service functions, and wherein the determined variables to include comprise variables in the declaration file not excluded in the sets of annotations for the service functions.

6. The method of claim 1, further comprising:
   providing a core action vocabulary with the declaration file including semantic representations of actions to perform with respect to the variables in the declaration file, wherein the sets of annotations for the service functions include the semantic representations defined in the action vocabulary to perform defined actions with respect to the variables; and
   using the core action vocabulary to determine the actions to perform for the semantics included in the sets of annotations with respect to the variables in the declaration file.

7. The method of claim 6, further comprising:
   providing at least one synonym action vocabulary including semantic representations of actions to perform with respect to the variables in the declaration file, wherein the sets of annotations for the service functions include the semantic representations defined in the at least one synonym action vocabulary to perform defined actions with respect to the variables, wherein the synonym action vocabulary provides semantic representations of actions that differ from the semantic representations defined in the core action vocabulary.

8. The method of claim 7, further comprising:
   processing the set of annotations for a selected one of the service functions;
   determining whether there is a synonym action vocabulary for the processed set of annotations;
   using the synonym action vocabulary for the processed set of annotations to determine the actions corresponding to the semantics in the processed set of annotations in response to determining that there is a synonym action vocabulary for the processed set of actions; and
   using the core action vocabulary for the processed set of annotations to determine the actions corresponding to the semantics in the processed set of annotations in response to determining that there is no synonym action vocabulary for the processed set of actions.

9. The method of claim 1, wherein the programming environment comprises a first programming environment and wherein the service functions are generated in a second programming environment.

10. A system, comprising:
    a computer readable storage medium including a declaration file having variable declarations for variables in a programming environment for use by application functions, wherein the declaration file includes a plurality of sets of annotations for a plurality of service functions, wherein each of the sets of annotations identifies variables from the variables declared in the declaration file to use with one of the service functions, and wherein the declaration file is written to define variables for use by functions in the programming environment; and
    a service function generator executed to perform operations, the operations comprising:
       processing the declaration file to generate one of the service functions;
       determining a set of annotations in the declaration file for the service function being generated;
       processing the determined set of annotations to determine variables from the variables to include with the service function being generated; and
       using the determined variables from the declaration file to generate the service function.

11. The system of claim 10, further comprising a plurality of service function generators to process the declaration file to determine the set of annotations corresponding to the service function being generated to use to determine the determined variables to include in the service function being generated.

12. The system of claim 10, wherein the operations further comprise:

using the determined set of annotations to process the determined variables, wherein the processed determined variables are used to generate the service function.

13. The system of claim 10, further comprising:
wherein the computer readable storage medium further includes a core action vocabulary with the declaration file including semantic representations of actions to perform with respect to the variables in the declaration file, wherein the sets of annotations for the service functions include the semantic representations defined in the action vocabulary to perform defined actions with respect to the variables; and
wherein the operations further comprise using the core action vocabulary to determine the actions to perform for the semantics included in the sets of annotations with respect to the variables in the declaration file.

14. The system of claim 13, further comprising:
wherein the computer readable storage medium further includes at least one synonym action vocabulary including semantic representations of actions to perform with respect to the variables in the declaration file, wherein the sets of annotations for the service functions include the semantic representations defined in the at least one synonym action vocabulary to perform defined actions with respect to the variables, wherein the synonym action vocabulary provides semantic representations of actions that differ from the semantic representations defined in the core action vocabulary.

15. The system of claim 14, wherein the operations further comprise:
processing the set of annotations for a selected one of the service functions;
determining whether there is a synonym action vocabulary for the processed set of annotations;
using the synonym action vocabulary for the processed set of annotations to determine the actions corresponding to the semantics in the processed set of annotations in response determining that there is a synonym action vocabulary for the processed set of actions; and
using the core action vocabulary for the processed set of annotations to determine the actions corresponding to the semantics in the processed set of annotations in response to determining that there is no synonym action vocabulary for the processed set of actions.

16. The system of claim 10, wherein the programming environment comprises a first programming environment and wherein the service functions are generated in a second programming environment.

17. An article of manufacture comprising at least one of a computer readable storage medium including code and a hardware device having hardware logic that performs operations, the operations comprising:
accessing a declaration file having variable declarations for variables in a first programming environment for use by application functions, wherein the declaration file includes a plurality of sets of annotations for a plurality of service functions, wherein each of the sets of annotations identifies variables from the variables in the declaration file to use with one of the service functions, and wherein the declaration file is written to define variables for use by functions in the programming environment;
processing the declaration file to generate one of the service functions;
determining a set of annotations in the declaration file for the service function being generated;
processing the determined set of annotations to determine variables from the variables to include with the service function being generated; and
using the determined variables from the declaration file to generate the service function.

18. The article of manufacture of claim 17, wherein a plurality of service function generators process the declaration file to determine the set of annotations corresponding to the service function being generated to use to determine the determined variables to include in the service function being generated.

19. The article of manufacture of claim 17, wherein the operations further comprise:
using the determined set of annotations to process the determined variables, wherein the processed determined variables are used to generate the service function.

20. The article of manufacture of claim 19, wherein processing the determined variables comprises renaming at least one of the determined variables from the declaration file, and wherein the at least one renamed determined variable is used to generate the service function.

21. The article of manufacture of claim 17, wherein the sets of annotations for different service functions indicate variables of the variables declared in the declaration file to exclude from the service functions, and wherein the determined variables to include comprise variables in the declaration file not excluded in the sets of annotations for the service functions.

22. The article of manufacture of claim 17, wherein the operations further comprise:
providing a core action vocabulary with the declaration file including semantic representations of actions to perform with respect to the variables in the declaration file, wherein the sets of annotations for the service functions include the semantic representations defined in the action vocabulary to perform defined actions with respect to the variables; and
using the core action vocabulary to determine the actions to perform for the semantics included in the sets of annotations with respect to the variables in the declaration file.

23. The article of manufacture of claim 22, wherein the operations further comprise:
providing at least one synonym action vocabulary including semantic representations of actions to perform with respect variables in the declaration file, wherein the sets of annotations for the service functions include the semantic representations defined in the at least one synonym action vocabulary to perform defined actions with respect to the variables, wherein the synonym action vocabulary provides semantic representations of actions that differ from the semantic representations defined in the core action vocabulary.

24. The article of manufacture of claim 23, wherein the operations further comprise:
processing the set of annotations for a selected one of the service functions;
determining whether there is a synonym action vocabulary for the processed set of annotations;
using the synonym action vocabulary for the processed set of annotations to determine the actions corresponding to the semantics in the processed set of annotations in response to determining that there is a synonym action vocabulary for the processed set of actions; and
using the core action vocabulary for the processed set of annotations to determine the actions corresponding to the semantics in the processed set of annotations in response determining that there is no synonym action vocabulary for the processed set of actions.

25. The article of manufacture of claim 17, wherein the programming environment comprises a first programming environment and wherein the service functions are generated in a second programming environment.

* * * * *